(12) United States Patent
Mainero

(10) Patent No.: US 12,520,756 B2
(45) Date of Patent: Jan. 13, 2026

(54) GRAIN CART WITH ACCESS AND SAFETY ELEMENT FOR MAINTENANCE, INSPECTION OR CLEANING OPERATOR

(71) Applicant: CARLOS MAINERO Y CIA. S.A.I.C.F.I., Bell Ville (AR)

(72) Inventor: Carlos Oscar Mainero, Bell Ville (AR)

( * ) Notice: Subject to any disclaimer, the term of this patent is extended or adjusted under 35 U.S.C. 154(b) by 812 days.

(21) Appl. No.: 17/820,756

(22) Filed: Aug. 18, 2022

(65) Prior Publication Data

US 2023/0054592 A1    Feb. 23, 2023

(51) Int. Cl.
*A01D 41/12* (2006.01)

(52) U.S. Cl.
CPC ..... *A01D 41/1217* (2013.01); *A01D 41/1226* (2013.01)

(58) Field of Classification Search
CPC .......................... A01D 41/1217; A01D 41/1226
See application file for complete search history.

(56) References Cited

U.S. PATENT DOCUMENTS

| | | | |
|---|---|---|---|
| 5,085,025 A * | 2/1992 | Gaddis | B60P 1/40 280/107 |
| 5,409,344 A * | 4/1995 | Tharaldson | B60P 1/42 D15/27 |
| 5,505,583 A * | 4/1996 | Gaddis | B60P 1/40 296/183.1 |
| 5,980,189 A * | 11/1999 | Rubner | B65G 41/002 414/528 |
| 7,543,765 B1 * | 6/2009 | Elling | E01C 19/2045 222/626 |
| 7,591,386 B2 | 9/2009 | Hooper | |
| 10,155,550 B2 | 12/2018 | Claerhout et al. | |
| 10,457,486 B1 | 10/2019 | Ulmer | |
| 2005/0254922 A1 * | 11/2005 | Berreau | B65G 65/466 414/310 |
| 2013/0149088 A1 * | 6/2013 | Matousek | B60P 1/42 414/502 |
| 2018/0244477 A1 * | 8/2018 | Stilborn | B60P 1/42 |
| 2019/0322461 A1 * | 10/2019 | Banthia | B60P 1/56 |
| 2020/0339359 A1 * | 10/2020 | Bergkamp | A01F 12/46 |
| 2024/0065169 A1 * | 2/2024 | Polries | A01D 90/12 |

FOREIGN PATENT DOCUMENTS

| | | | |
|---|---|---|---|
| AU | 2015101217 A4 | 10/2015 | |
| GB | 995677 A | 6/1965 | |

* cited by examiner

*Primary Examiner* — Abigail A Risic
(74) *Attorney, Agent, or Firm* — Egbert, McDaniel & Swartz, PLLC

(57) ABSTRACT

Disclosed is a grain cart having an inverted V-shaped ridge on top of the cover of the flow gate system to reduce the grain load on the blades and the force required to move them. The ridge includes supports for a walkway that provides safety to cleaning, inspection and maintenance personnel for mechanisms at the bottom of the hopper, in particular the sweep auger and the flow gate system, without affecting the unloading rate. Such supports include a series of inverted V-shaped plates placed on edge to reduce the obstruction to the passage of grains, the plates having a horizontal upper web that forms a non-slip surface for the operator to walk on the walkway. The ridge with walkway only occupies the central portion of the ridge, leaving a free area towards the sides that allows the free passage of grains and pellets of compacted wet grain during unloading.

17 Claims, 3 Drawing Sheets

GRAIN CART WITH ACCESS AND SAFETY ELEMENT FOR MAINTENANCE, INSPECTION OR CLEANING OPERATOR

CROSS-REFERENCE TO RELATED APPLICATIONS

Not applicable.

BACKGROUND OF THE INVENTION

1. Field of the Invention

The present invention relates to a field of agricultural machinery to which grain carts belong, which are understood as pull-type vehicles with a built-in grain auger used to convoy a combine or harvesting machine to receive and then transfer harvested grain to trucks, trailers, train cars, silos, baggers or other means of transport or storage. The invention relates to a walkway inside the hopper for maintenance and cleaning personnel, in particular at the bottom of the hopper including a sweep auger.

2. Description of Related Art Including Information Disclosed Under 37 CFR 1.97 and 37 CFR 1.98

Grain carts began to be actively used in agriculture in the last thirty years, due to the interest in increasing the efficiency of combines by reducing downtime for unloading the harvested grain. Since then, they have been developed with larger load capacity, shorter unloading time, less soil compaction, etc.

There are two large groups of grain carts, those with a single auger and those with a double auger. The first have as their main advantage the mechanical simplicity of a single auger, while having a good unloading speed, but they have a great shortcoming in the maximum possible size (capacity) due to their operating principle. As the slope angle of most grains is below 45°, the hopper thereof should be an inverted pyramid with the faces at more than 45° to be able to discharge all the grain material that is inside. In addition to the fact that said implements must circulate on tracks and roads, they must respect the maximum allowed width, therefore the maximum size or volume that grain carts of this type is limited.

To achieve a larger loading capacity, it is only possible to increase height and length. The next limitation being the height of said grain carts (3.8 m), so it is only possible to extend the length thereof to continue increasing the volume and therefore the load capacity. As a direct consequence of this style of elongated hoppers, dual auger systems have been introduced, the unloading systems of which are characterized by being made up of two augers, a horizontal auger that runs along the bottom of the hopper along its length, commonly referred to as sweep auger, and the second auger in the inclined vertical plane for unloading the grains into trucks, baggers, etc. Said augers can be divided into segments, most commonly the vertical auger can be folded and stored in the front of the hopper while discharge is not taking place, to avoid collisions at height with other objects in day-to-day use or during transport.

For correct operation and to minimize transmission stress when starting to unload a dual auger grain cart, the horizontal auger usually has a flow gate or guillotine system that allows grains to pass or not to the auger in a controlled manner. That is, the opening can be regulated and, therefore, the grain flow entering the auger in order to regulate the unloading speed and/or the torque carried out by the transmission, while enabling the desired quantity to be unload, if so required, gradually closing said flow gate and enabling the augers to be discharged and cleaned, both the horizontal and vertical auger, to enable a new smooth start in the next unload.

The flow gate system is made up of an inverted V-shaped cover that is located above the horizontal auger on which two blades rest and slide, which are activated by means of a cam system. This transforms the longitudinal movement of an actuator, such as a hydraulic cylinder, into a vertical movement in the inclined planes of the cover, to enable the opening or closing of the same, and thus allow the grains to pass or not to the auger.

This system is very reliable, but it brings with it some drawbacks in the day-to-day use of the implement. Some of the problems are related to the wear generated in the moving parts, mainly due to the force that must be generated in order to open the flow gate. One of the causes is the weight of the grain material that rests thereon, which generates a high resistance to the movement of the blades.

Furthermore, it has also been observed that a flow gate system with this shape, as well as facilitating the sliding of the grains that are above it, also makes it difficult for an operator or person inside the hopper to walk, whether they have to carry out cleaning work, generally when there is a change of crop or variety within the same crop, or in the case of custom harvesters who must clean said hoppers when changing customers or batch, to ensure that they do not mix or contaminate one variety with another, as well as when an inspection of the inside of the hopper is required for correct operation and maintenance. This inclination of the faces of the flow gates blades and the walls mainly affects the safety of the operator who must walk thereon with one foot on each inclined plane. In turn, with use thereof, the walls are polished by the passage of the grains, making conditions favorable for the operator to slip and be struck.

Some grain carts on the market incorporate a grate floor that serves as a safety element for the operator, as well as to prevent the passage of foreign objects towards the auger. Australian (AU) Patent Publication No. 2015/101217 and U.S. Pat. Nos. 7,591,386 and 10,457,486 illustrate hoppers incorporating such a grate floor.

This grate floor has the drawback that, if the grain is very wet and, at the same time, pellets of compacted grain are generated because it is mixed with dirt and other impurities typical of the harvest, it makes it difficult for it to pass through to the auger, reducing the discharge capacity of the implement.

Other known background of grain carts with accesses and safety elements for cleaning or maintenance operators include, for example, the British (GB) patent No. 995,677 with a safety guard for a lift auger and the North American U.S. Pat. No. 10,155,550 that proposed a fold-down platform on the side wall of the hopper.

BRIEF SUMMARY OF THE INVENTION

The objective of the present invention is to solve both problems (namely, difficulties walking inside the hopper for cleaning or maintenance tasks and obstructions caused by grains compacting on grate floors) with a ridge on the guillotines or gates that allows them, on the one hand, to be protected and, at the same time, provide safety to the operator during cleaning and maintenance tasks.

The present invention therefore incorporates a ridge above the flow gate system that is capable of supporting the weight of the grains located above of it, thus reducing the force required to move the blades. This results in a longer useful life for the moving parts of the system, as well as less wear over time. This ridge has the particularity of leaving an open space between the sides of the hopper and the bottom portion thereof in such a way so as not to negatively affect the flow of grain material when unloading, and of adopting the inverted V shape that allows full emptying.

In turn, a walkway is added or formed to the ridge that enables the operator to walk and move safely without affecting the performance of the unloading system, that is, without affecting the unloading speed, which is essential for these implements. The walkway can be supported by supports that, simultaneously, act as reinforcements for the ridge that is suspended and supporting the weight of the grains, creating a platform with plates placed on edge to reduce the obstruction to the passage of grains, while they simultaneously contribute to being a non-slip element for the operator to walk on.

The ridge over the flow gate thus fulfils the dual function of protecting the mechanisms thereof and reducing opening loads as well as acting as a platform to walk on without risk to the operator during cleaning. As an advantage and difference from the grate floor, the walkway only occupies the central portion of the ridge, and not an entire horizontal plane in the hopper that creates a barrier to the flow of the grains; on the contrary, it leaves a free area towards the sides that allows the free passage of the grains and pellets of compacted wet grain that may be generated, thus reducing to a minimum any braking effect on the sliding of the grains during unloading, but a reliable and non-slip platform for the operator to move around on during cleaning, inspection and maintenance work.

BRIEF DESCRIPTION OF THE SEVERAL VIEWS OF THE DRAWINGS

In order to provide greater clarity and understanding of the object of the present invention, it has been illustrated in several figures, in which the invention has been represented in one of the preferred embodiments, all by way of example, wherein.

Lastly.

DETAILED DESCRIPTION OF THE INVENTION

Figure 1:
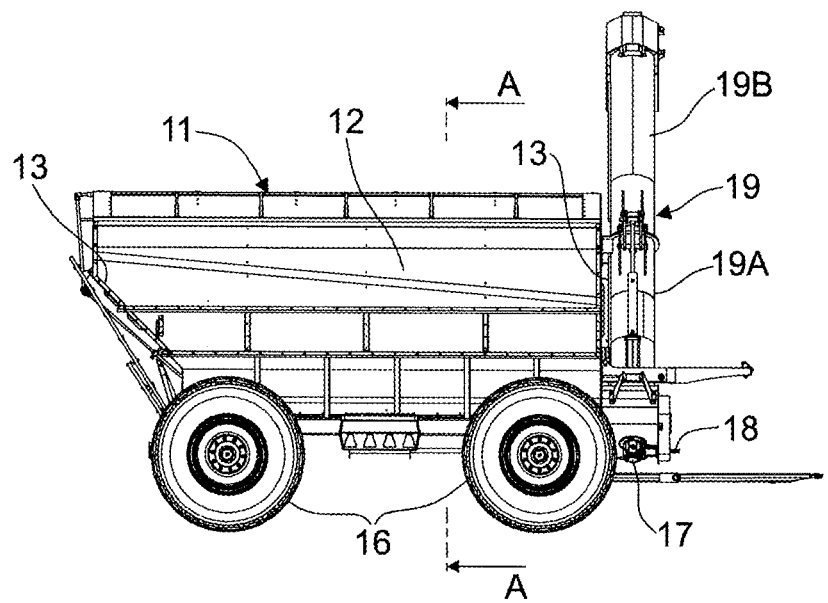
FIG. 1 is a side elevation view of a grain cart of the type to which the present invention is applied.
Figure 2:
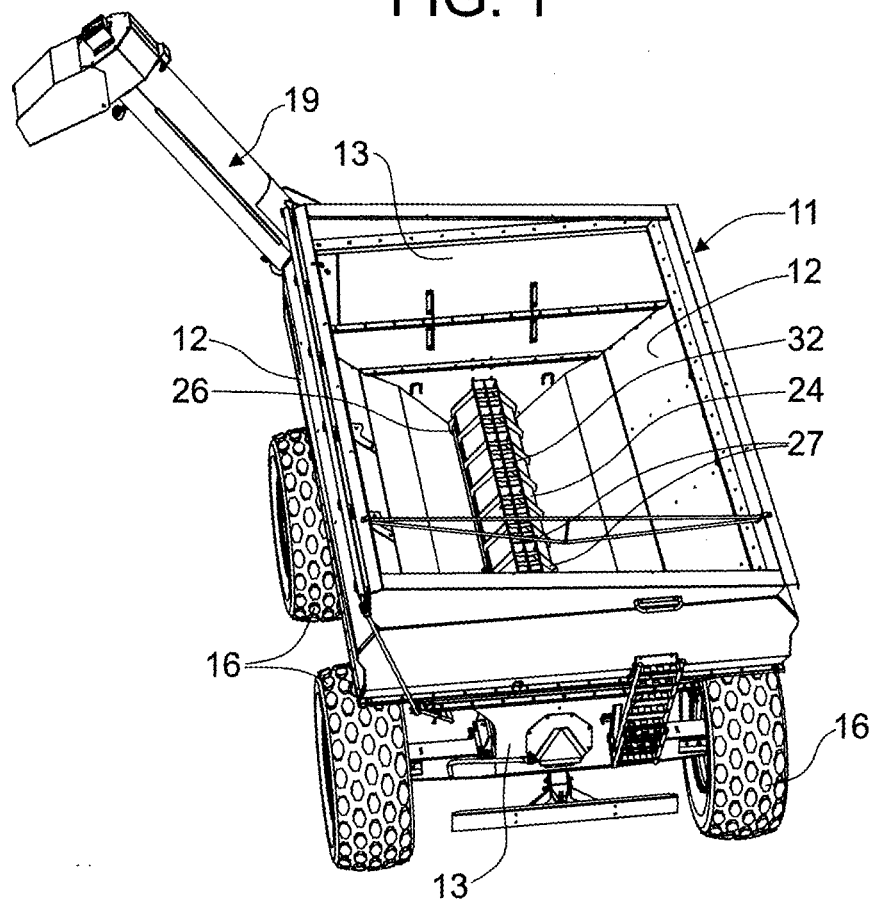
FIG. 2 is a rear perspective view of a grain cart provided therein with a ridge with a walkway according to a preferred embodiment of the present invention.

FIGS. 1 and 2 show a grain cart comprised by a hopper 11 intended to contain grain with side walls 12 extending longitudinally between end walls 13. Those side walls 12 are inclined inward and downward converging towards a bottom 14 with an angle normally determined by the natural slope of the grain. Although the hopper 11 is represented mounted on two axles with wheels 16, the present invention is equally applicable to grain carts with a single axle, with a multi-axle system with tandem axles or tracks according to the terrain for which the grain cart is to be used.

On the outer side of one of the end walls 13, corresponding to the front end, there is a gearbox 17 with a splined shaft 18 for coupling to a tractor PTO to drive a grain auger or vertical auger 19 made up of two segments 19A and 19B hinged with respect to each other, the lower segment 19A coupled to the gearbox 17 by bevel gears while the upper segment 19B ends in a discharge spout.

FIG. 2 shows the inside of the hopper 11. Above the bottom there extends a longitudinal auger 21 which is driven—together with the vertical auger 19—from the gearbox 17 to sweep the grain at the bottom of the hopper towards the vertical auger 19 which raises and unloads the grain in a means of transport or storage such as those mentioned. Above the sweep auger 21 there is an inverted V-shaped cover 22 that acts as a fastening structure for a variable pitch flow gate device, comprised of two blades 23 slidable on inclined planes of the cover 22, functioning as gates to regulate the flow of the granular material contained in the grain cart towards the auger 21 at the bottom of the hopper 11.

The blades 23 are mounted on the inclined walls of the cover 22, bolted to a cam system that enables the longitudinal movement of an actuator to be transformed into a transverse movement on the inclined planes on each side of the cover 22 for opening and closing the blades 23. This cover 22 is bolted to the inclined side walls 12 of the hopper by means of support strips that replicate the internal shape of the cover 22 and end perpendicular to the surface of the side faces 12 of the hopper to be able to be fastened to them by means of bolts for easy removal thereof.

Figure 3A:
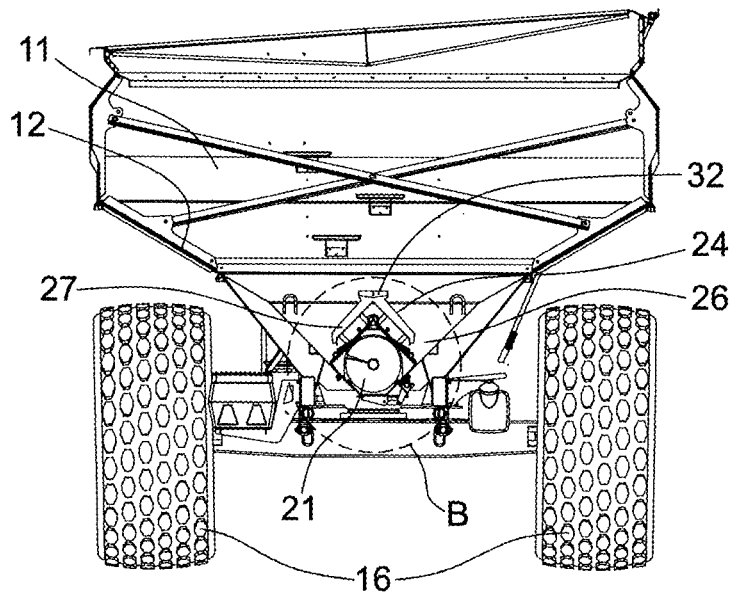
FIG. 3A is a cross-sectional view of the grain cart according to plane A-A of FIG. 1.
Figure 3B:
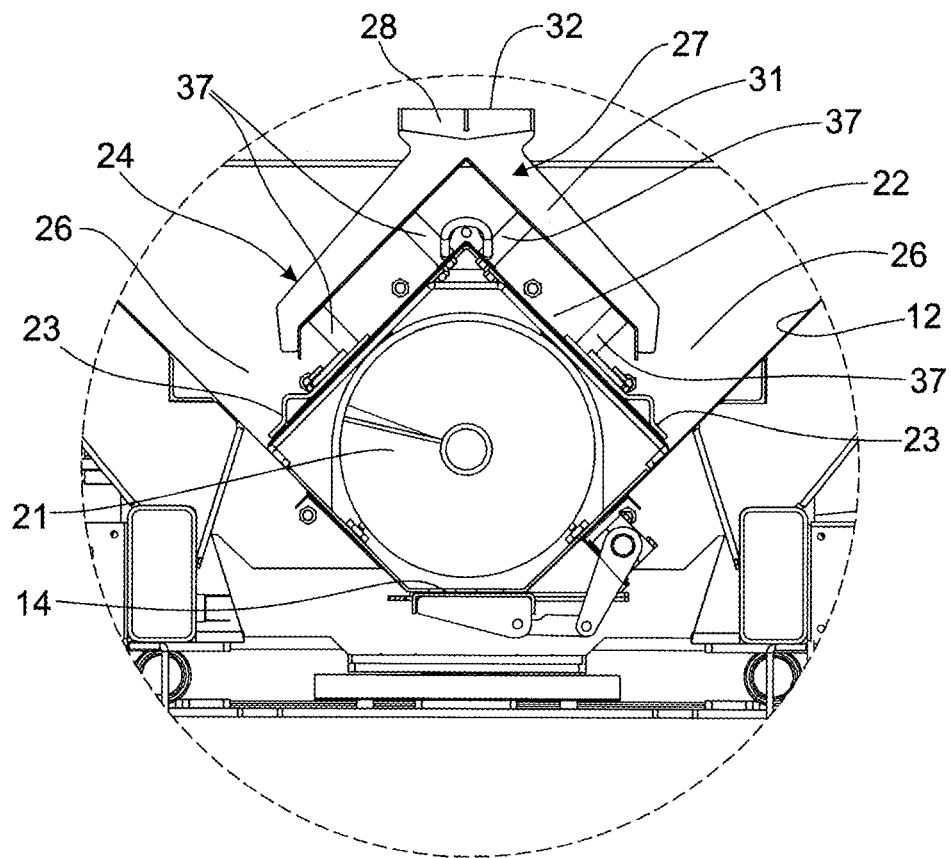
FIG. 3B is a magnified view of detail B of FIG. 3A corresponding to the ridge with a walkway.
Figure 4:
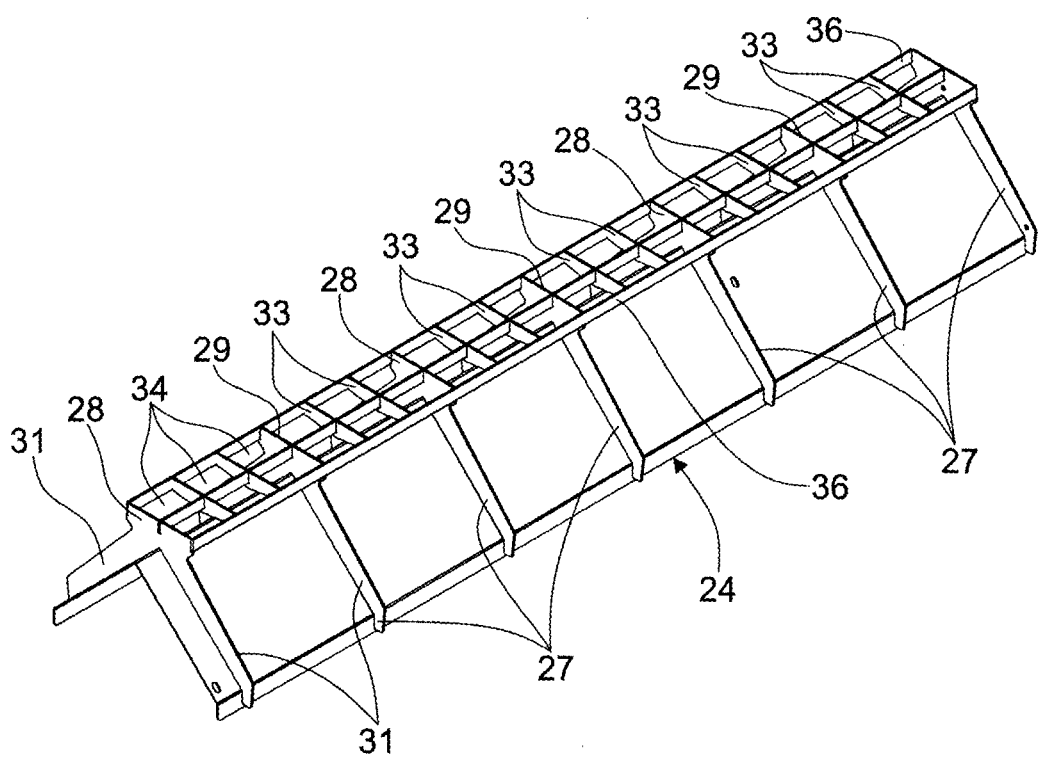
FIG. 4 is a perspective view of the ridge with a walkway of FIGS. 2 and 3 according to a preferred embodiment of the present invention.

FIGS. 2 and 3A show the grain cart with an inverted V-shaped ridge 24, according to the present invention. The ridge 24 is arranged longitudinally and suspended over the flow gate system 23, leaving two open spaces 26 on the flanks of 12 cm between the sides 12 of the hopper and the bottom of the ridge 24 in such a way so as not to negatively affect the flow of the grain material during unloading. The cover, which was already calculated to withstand the weight of the grain material that it usually contains above, supports the weight of the ridge 24. In this preferred embodiment, the ridge 24 is formed of reinforcing ribs and holds a series of identical plates 27 arranged on edge and spaced 400 mm from each other, by way of gantries, and joined together by 100×31.7 mm (4"×¼") strips as shown more clearly in FIGS. 3B and 4.

Figure 5:
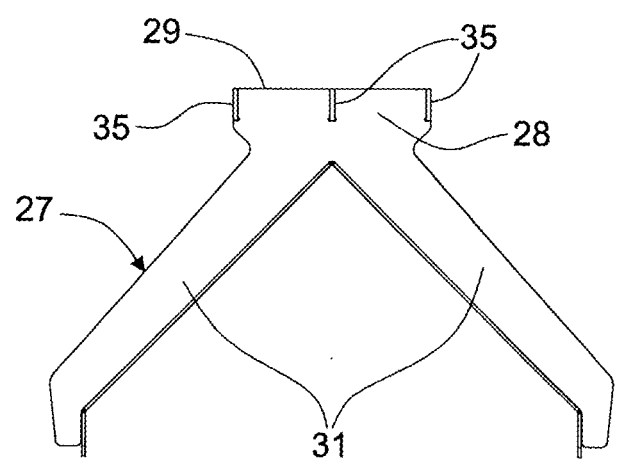
FIG. 5 is a plan view of a plate formed for a ridge gantry with a walkway of FIG. 4 according to a preferred embodiment of the present invention.

The outlines of the plates 27 are laser cut from sheets of SAE 1010/20 material with a thickness of 4.8 mm (³⁄₁₆") to shape them, as also shown in FIG. 5, with a horizontal web 28 having flat upper edges 29 with serrations to provide the walkway with non-slip properties and a pair of side wings 31 projected outwards and downwards, that is, in an inverted "V" towards the side walls of the hopper in a transverse direction, to fully rest on the inclined planes of the cover 22. In the embodiment represented, the upper web 28 measures 200 mm long and 32 mm high at the edge where a platform 32 is welded by way of a gateway for an operator to carry out maintenance tasks on the blades 23 and on the sweep auger (horizontal) 21. The cut of each plate 27 includes a notch 35 in the middle of the web 28 to facilitate the fitting and welding of the platform 32. Alternatively, the plates 27 can be located closer to each other such that their same serrated horizontal upper edges 29 constitute a latticed surface for a walkway with non-slip properties.

In the embodiment represented by way of example, part of the non-slip latticed surface of the walkway is formed by the horizontal upper edges 29 of the plates 27 and the rest by crossbeams 33 of the platform 32, with a distance of 133 mm between each other, leaving openings 34 so that there are no accumulated grains on the walkway once the hopper has been emptied. The platform 32 comprises two side beams 36 between which multiple crossbeams 33 are staggered that complete the walkway in the spaces between successive plates 27 such that the walkway is defined by the webs 28 of the plates 27 and the crossbeams 33 of the platform 32. The platform 32 is supported by the plates 27 of the ridge 24 that act as gantries resting on the inclined planes of the cover 22, directly or by means of spacers 37 to give more height to the ridge-walkway assembly.

The addition of the ridge 24 above the flow gate system 23 allows the weight of the grain material to be supported by the ridge and not by the blades, solving the problem of the weight of the grains that increased the normal force of the blades 23 against the cover 22 (it pressed on them), which increased the friction force, making it difficult to open and close, increasing the force made by the actuator cylinder and overloading the cams that convert the longitudinal movement of the actuator into a transversal movement for both blades 23, to the point of being able to tear the lugs of the cams.

A preferred embodiment for putting into practice the present invention has been described above notwithstanding the fact that various changes may be envisaged without departing from the teachings of the present invention. For example, it has been chosen to secure the walkway to the ridge 24, taking advantage of its robustness, instead of directly to the hopper such as by means of support feet against the side walls 12 of the hopper. Likewise, the walkway can be continuous or segmented into sections.

I claim:

1. A grain cart assembly comprising:
   a hopper having a bottom and end walls and side walls, the side walls extending longitudinally between the end walls and inclined inwardly and downwardly towards the bottom;
   a longitudinal conveyor apparatus extending horizontally along the bottom of said hopper;
   a grain-flow regulating device positioned on said longitudinal conveyor apparatus so as to regulate a passage of grain material in said hopper towards said longitudinal conveyor apparatus; and
   a safety element comprising a walkway arranged longitudinally over said grain-flow regulating device, the walkway adapted to allow maintenance personnel or inspection personnel or cleaner personnel to walk safely thereon.

2. The grain cart assembly of claim 1, wherein the walkway is continuous.

3. The grain cart assembly of claim 1, wherein the walkway is formed by an upper face of a ridge arranged longitudinally on said grain-flow regulating device.

4. The grain cart assembly of claim 3, wherein an open face is formed between the ridge and the sides of said hopper, the open face adapted to allow the passage of grain therethrough during an unloading of said hopper.

5. A grain cart assembly comprising:
   a hopper having a bottom and end walls and side walls, the side walls extending longitudinally between the end walls and inclined inwardly and downwardly toward the bottom;
   a longitudinal conveyor apparatus extending longitudinally on the bottom of said hopper;
   a grain-flow regulating device positioned on said conveyor so as to regulate a passage of grain material in said hopper toward said longitudinal conveyor apparatus; and
   a safety element comprising a walkway extending longitudinally over said grain-flow regulating device, the walkway adapted to allow maintenance personnel or inspection personnel or cleaner personnel to walk safely thereon, wherein the walkway is formed by an upper face of a ridge arranged longitudinally on said grain-flow regulating device, wherein said grain-flow regulating device has a cover suspended over said longitudinal conveyor apparatus and has slidable blades mounted thereon, the ridge being suspended on said grain-flow regulating device and supporting a succession of plates arranged on edge and spaced from one another in a gantry form, the plates of the succession of plates being formed with a flat horizontal upper edges that define the walkway.

6. The grain cart assembly of claim 5, wherein the ridge has an inverted V-shape, the plates of the succession of plates having side wings.

7. The grain cart assembly of claim 5, wherein the flat horizontal upper edges of the plates have serrations thereon.

8. The grain cart assembly of claim 5, wherein the walkway has a platform fastened to the succession of plates.

9. The grain cart assembly of claim 8, wherein the platform has a pair of side beams joined by crossbeams interposed between a series of plates such that the upper edges of the series of plates and the crossbeams define a non-slip surface of the walkway.

10. The grain cart assembly of claim 1, wherein said longitudinal conveyor apparatus has a sweep auger arranged horizontally, said hopper having a grain auger or lift auger at an end of said hopper and below the sweep auger.

11. The grain cart assembly of claim 3, wherein the walkway occupies a central portion of the ridge.

12. The grain cart assembly of claim 3, wherein said grain-flow regulating device has a cover suspended over said longitudinal conveyor apparatus and has slidable blades mounted thereon.

13. The grain cart assembly of claim 12, wherein the ridge is suspended on said grain-flow regulating device and supports a succession of plates arranged on edge and spaced from one another in a gantry form, the succession of plates being formed with flat horizontal upper edges.

14. The grain cart assembly of claim 12, wherein the ridge has an inverted V-shape, the plates of the succession of plates having side wings.

15. The grain cart assembly of claim 12, wherein the flat horizontal upper edges have serrations thereon.

16. The grain cart assembly of claim 12, wherein the walkway has a platform fastened to the succession of plates.

17. The grain cart assembly of claim 15, wherein the platform has a pair of side beams jointed by crossbeams interposed between a series of plates such that the flat horizontal upper edges of the plates and the crossbeams form a non-slip surface of the walkway.

* * * * *